United States Patent [19]

Latham

[11] Patent Number: 5,094,123
[45] Date of Patent: Mar. 10, 1992

[54] PUSH-PULL CABLE CONTROL ACTUATOR ASSEMBLY

[76] Inventor: Robert P. Latham, 280 SW. 32nd Ct., Fort Lauderdale, Fla. 33315

[21] Appl. No.: 562,565

[22] Filed: Aug. 3, 1990

[51] Int. Cl.⁵ .......................... F16C 1/12; G05G 1/04
[52] U.S. Cl. ................................ 74/501.6; 74/480 B; 74/523; 74/501.5 R
[58] Field of Search ..................... 74/501.5 R–502.6, 74/480 B, 523, 491

[56] References Cited

U.S. PATENT DOCUMENTS

| | | | |
|---|---|---|---|
| 944,879 | 12/1909 | Larkin | 74/501.6 |
| 1,433,688 | 10/1922 | Stahl | 74/501.6 |
| 2,448,696 | 9/1948 | Arens | 74/501.6 |
| 2,957,352 | 10/1960 | Pierce | 74/523 X |
| 3,160,027 | 12/1964 | Waner | 74/501.6 |
| 4,119,186 | 10/1978 | Choudhury et al. | 74/480 B X |
| 4,195,534 | 4/1980 | Prince | 74/480 B X |
| 4,280,371 | 7/1981 | Kobelt | 74/480 B |
| 4,801,282 | 1/1989 | Ogawa et al. | 74/480 B X |
| 4,854,259 | 8/1989 | Cluett | 74/480 B X |

Primary Examiner—Vinh T. Luong
Attorney, Agent, or Firm—Alvin S. Blum

[57] ABSTRACT

A remote control box for actuating push-pull cables is arranged for use with different numbers of cables, using different numbers of the same, modular components. A housing includes two stationary side members with one or more modular intermediate assemblies supported between the side members. One side member and each intermediate assembly includes a suppport element with connections for one or two control cable sheaths and a control disc rotatably supported on the support element. The control disc is provided with connections for one or two control cable cores and a handle with knob for manually rotating the disc and thereby pushing or pulling the core relative to the stationary sheath. Sheath connections on the support elements and core connections on the control discs are connectable at a variety of positions to accommodate cables entering at a variety of angles to the control box, and for both pushing and pulling simultaneously for use as a relay station.

10 Claims, 3 Drawing Sheets

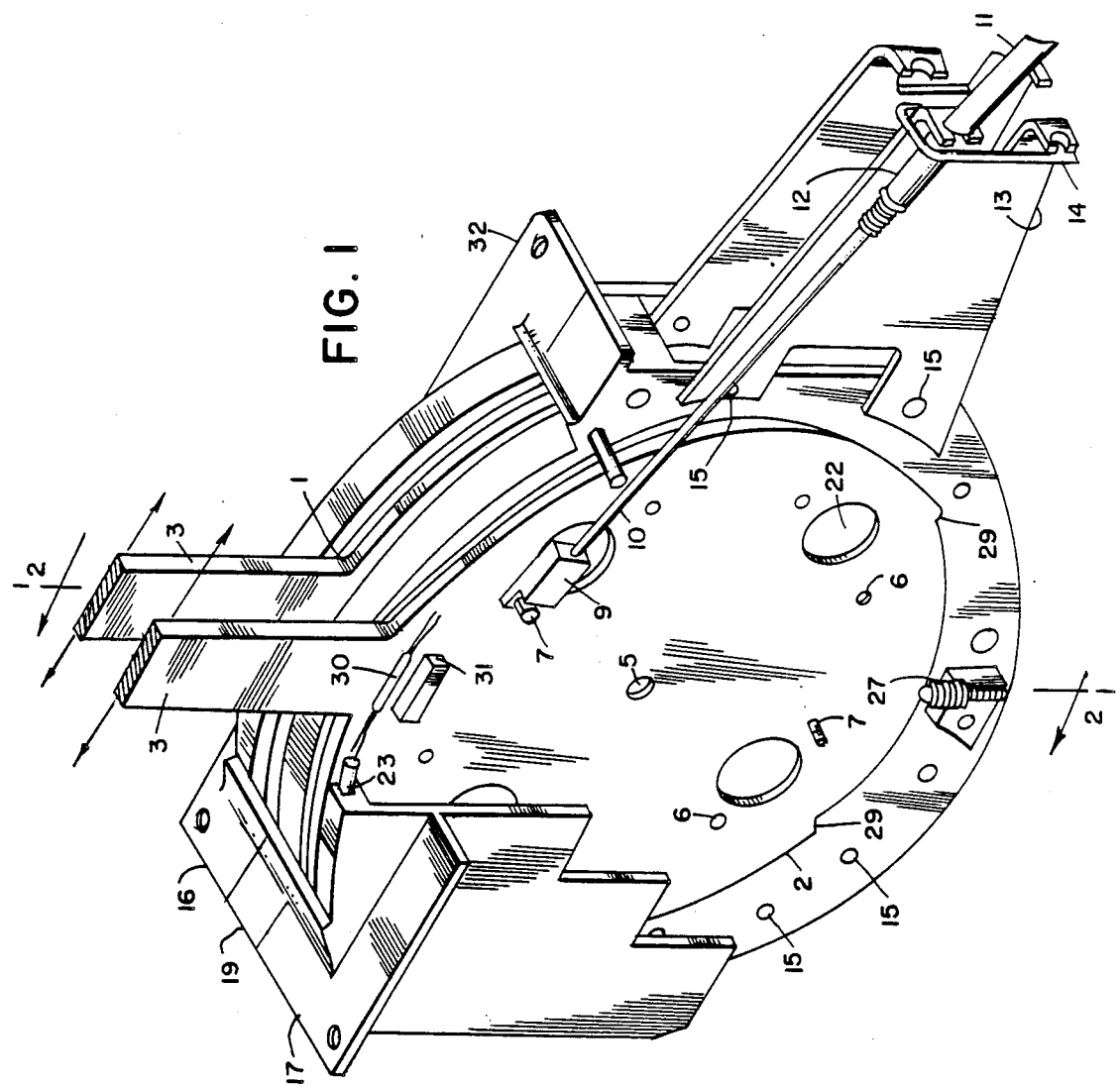

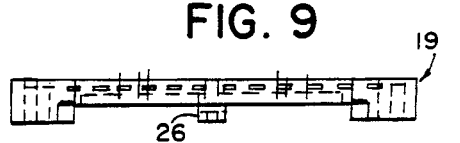
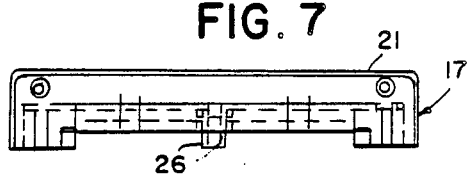
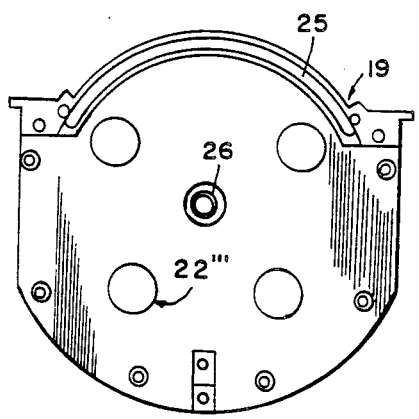
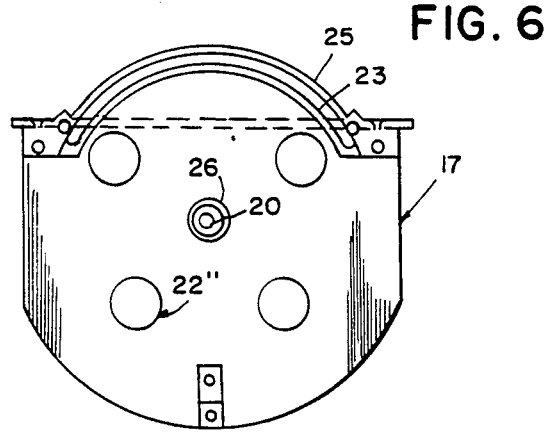
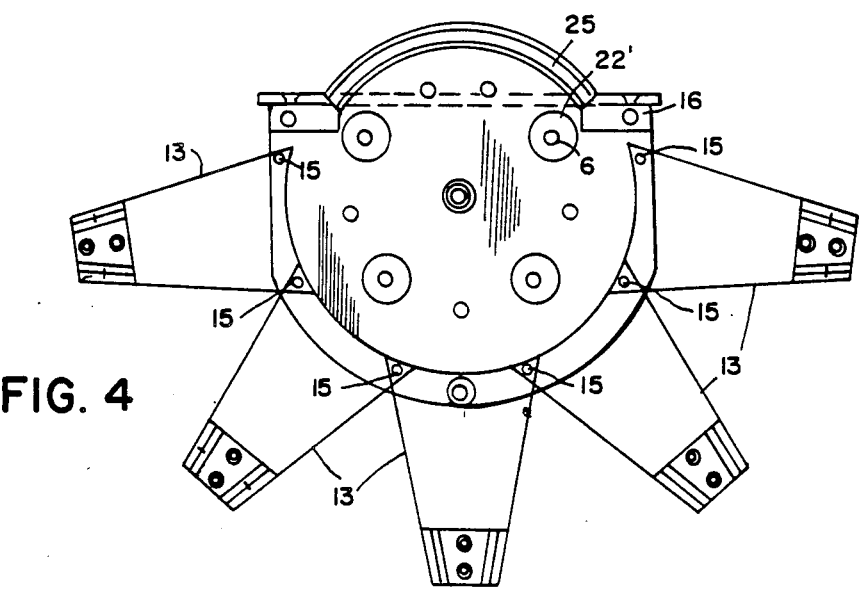

PUSH-PULL CABLE CONTROL ACTUATOR ASSEMBLY

BACKGROUND OF THE INVENTION

This invention relates to actuating devices for flexible cables and more particularly to actuators for remote control of such apparatus as marine propulsion devices in which push-pull cables of the type with a core movable axially within an anchored sheath are actuated for transmission of manually applied tensile or compressive forces on the core to control elements such as transmissions and throttles on the propulsion devices.

Control actuator assemblies of the prior art are generally not versatile in their application. Each model is arranged to suit a single purpose, including: the operation of a particular number of cables; cables extending from the assembly at only one particular angle; cables either pulled or pushed when control lever is moved in one particular direction; operation as a relay station wherein two controls at different locations are interconnected so that either may control the propulsion device.

Generally the replacement of a control cable requires disassembly of the actuator assembly or use of special terminals.

SUMMARY OF THE INVENTION

It is accordingly an object of the invention to provide a push-pull cable control actuator assembly that is more universally adaptable to a variety of installation and application requirements including: varying the number of cables controlled; varying the direction from which the cable extends from the assembly; changing from pushing to pulling when the control lever is moved in a particular direction; providing for use as a relay station for a second actuator at another location.

It is another object of the invention to provide such an assembly that includes water seal means for substantially excluding water from the mechanism.

It is yet another object to provide such as assembly in which a cable may be replaced without disassembly of the unit.

It is yet another object that a convenient and watertight safety switch be provided for a transmission control element that prevents starting the propulsion device when transmission is not in neutral.

The control actuator assembly of the invention comprises a stationary housing with means for attaching to the vessel. The housing is made up of two outer members and one or more inner members interposed between the outer members. The inner members fit tightly against each other and against one outer member while providing a rectangular, horizontal aperture in the upper surface at the junction of two inner members or an inner member with an outer member. When a single inner member is combined with two outer members, two such apertures are formed. Every additional inner member in the assembly increases the apertures by one. Held between each inner member and another inner member or between an inner member and an outer member is a control disc journaled to an axle means for rotatably supporting the discs at their center. The axle means are connected to the housing members. Extending radially from an outer edge of each control disc is a control lever with a handle at its terminus. The control lever and a portion of the disc extends through the rectangular aperture so that the lever and handle are above the housing for manual rotation of the disc. Located radially from the center of the disc in a circle are a plurality of holes for connection to attachments for the core of a push-pull cable. A plurality of mounting holes are provided on the perimeter of the housing members for attachment of mounting elements that hold the sheath of the push-pull cable so that the cable may extend from the housing in a direction selectable from a variety of directions to best suit a particular installation, and the particular mounting hole for anchoring the core to the control disc is selected accordingly to cooperate with the angle at which the sheath of the cable is anchored by the mounting element. The mounting element is provided with means for anchoring the sheaths of a pair of cables and the core mounting holes are arranged with approximately diametrally opposed holes for attachment of the cores of the pair of cables directly opposite each other so that when a control lever is moved in one direction, the disc pulls the core of one cable and pushes the core of the other cable of the pair a substantially equal and opposite amount. This is useful when a pair of control stations are linked together so that one acts as a relay station.

The rectangular aperture through which the lever and a portion of the disc protrudes is framed by resilient sealing elements mounted in the housing members. These bear against the edge and sides of the disc, substantially preventing water from entering the aperture.

These and other objects, advantages and features of the invention will become more apparent when the detailed description is considered in conjunction with the drawings.

BRIEF DESCRIPTION OF THE DRAWINGS

FIG. 1 is a perspective view of the assembly of the invention for two control levers with portions broken away.

FIG. 4 is a side view of a first side housing member.

FIG. 5 is a top view of the first side member of FIG. 4.

FIG. 6 is a side view of the second side housing member.

FIG. 7 is a top view of the second side member of FIG. 6.

FIG. 8 is a side view of an intermediate housing member.

FIG. 9 is a top view of the intermediate member of FIG. 8.

DETAILED DESCRIPTION OF THE PREFERRED EMBODIMENT

Figure 3:
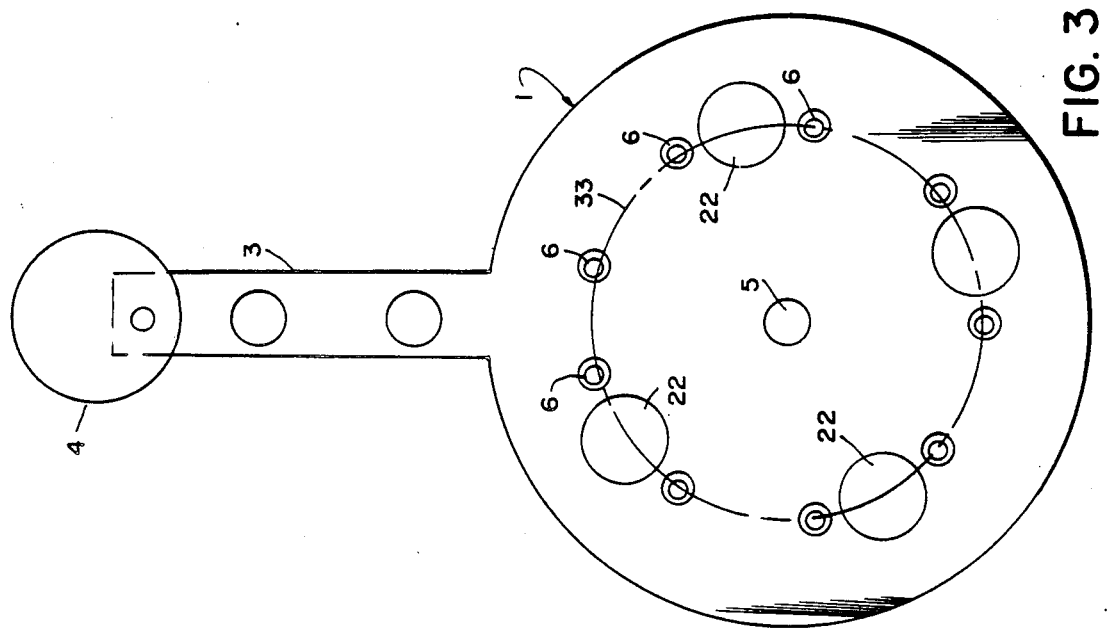
FIG. 3 is a side view of a control member.

Referring now first to FIG. 3, each movable control member 1 arranged for axially moving one or two cable cores 10 includes a thin flat disc 2. Extending radially from the perimeter of the disc is a control lever 3 terminating in handle 4. Moving handle 4 causes the disc to rotate about a central axis 5. Countersunk bearing elements 6 are distributed in a circle 53 about axis 5.

Figure 2:
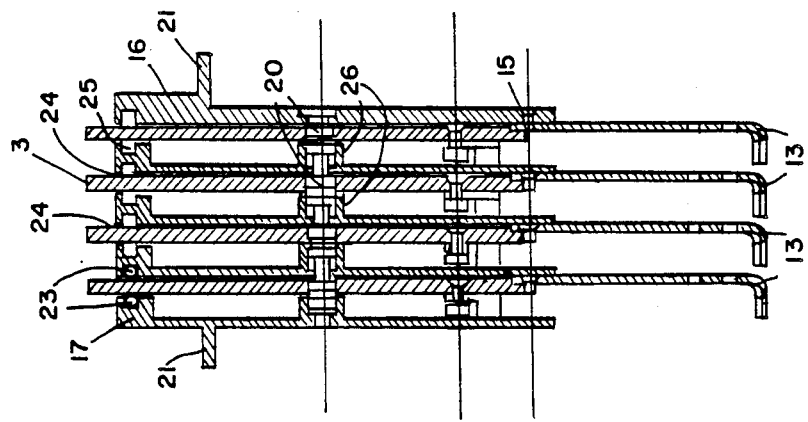
FIG. 2 is a sectional view equivalent to that taken on line 2—2 of FIG. 1 of an assembly with four control levers for cables entering from below.

Referring now to FIGS. 1–3, threaded axle 7 fits into a bearing element 6 on the disc of the control member at a selected point on the circle appropriate to the direction in which the control cable 11 enters the assembly. The axle 7 engages core connector 9 that is attached to the core 10 of cable 11. The sheath 12 of the cable is anchored by clamp 14 to anchoring member 13, which is provided with means for anchoring two cables that may be actuated by a single control member. By engaging the cores at opposed bearing elements 6, one core may be pushed while the other is pulled by approximately the same amount. This is useful for controlling an element that must be pulled and pushed simultaneously and it also serves as the relay station for a pair of remote control stations controlling a common element. The sheath anchoring member 13 is attached to a housing member by two screws at screw holes 15. These screw holes are distributed about the housing so as to enable mounting a cable at any one of five different angles, as best seen in FIG. 4 where anchoring members 13 are shown mounted at all positions.

The housing 32 is made up of a first side member 16 (FIGS. 4, 5), a second side member 17 (FIGS. 6, 7) and one or more intermediate members 19 (FIGS. 8, 9) that are bolted tightly between the side members. A housing with one intermediate member supports two control members, each additional intermediate member increases the number of control members supported by one. This provides economy of manufacture and parts inventory, since the same basic elements may be assembled to control a particular number of cables at any angle, for push, pull or push-pull and linked pairs as required for any particular application.

The housing members are arranged to support axle means 20 on axle supports 26 for rotatably supporting the control member 1 at central hole 5. The two side housing members 16 and 17 have mounting flanges 21 for affixing the assembly to a boat structure. Access holes, 22", 22" and 22"' in the housing and control members may be aligned to provide access to the threaded axle 7 and core connector 9 so that a cable may be replaced without dismantling the assembly. The housing members are arranged to provide rectangular apertures 24 between a side member and an intermediate member and between adjacent intermediate members. Each control member is journalled on an axle means 20 between adjacent housing members so that the control lever 3 and a portion of the disc 2 protrudes through the aperture. A resilient, weatherproof lubricous plastic tubing weatherstrip 23 is held in place in slots 25 in the housing about the aperture 24 to provide a sliding seal against the edge and faces of the disc to restrict passage of water therethrough.

Various types of detents 27 and stops 29 to control motion of the disc of types well known in the art may be provided as desired.

Optionally, an electric control means may be provided to control an element based on a position of a control lever, such as preventing starting an engine when a transmission is not in neutral. A magnetic switch 30 is held within tubing 23. A magnet 31 is attached to a disc such that only when the control lever is in neutral position the switch is actuated by the magnet to the conduct or on condition.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. An actuator assembly for moving at least one core of push-pull cables relative to their sheaths comprising:
    a) a stationary housing including:
        1) a first side member;
        2) a second side member;
        3) at least one intermediate member interposed between said first and second side members;
        4) securing means on said first and second side members for securely mounting said assembly to a fixed structure, and joining means for removably joining said side and intermediate members together, said intermediate member cooperating with adjacent intermediate members and with said side members to form a closed upper surface on said housing with a plurality of substantially rectangular apertures therein;
    b) a plurality of movable control members, each said control member including: a flat, substantially circular disc journalled for rotation about a control axle means, said control axle means passing through the center of said disc and supported by said housing for rotatably supporting said disc; a control lever extending radially from an edge of said disc; a handle affixed to the distal end of said lever for manual rotation of said disc; and a plurality of core-connecting means disposed on said disc in a circle about said center arranged for connecting to the core of a push-pull cable at a selected point on said circle, with pairs of said connecting means being opposed for selectively connecting a core to a first member of a pair of said connecting means to move a first core in a first direction and to a second member of said pair to move a second core in a second opposite direction when said disc is rotated by pushing said handle in one direction; said pair of opposed connecting means also serving for connecting to the cores of a pair of push-pull cables for serving as a connection for linking at least two control assemblies together for controlling a common element, each said control member rotatably supported on said axle means with said control lever and a portion of said disc extending above said upper surface through one of said rectangular apertures;
    c) a plurality of sheath-retainer members, each said retainer member arranged for cooperating with the sheath of at least one push-pull cable to retain a portion of said sheath to essentially prevent axial movement thereof during actuation of a core by said control member; and
    d) a plurality of connecting means for fixedly connecting each said sheath-retaining member to said housing, said connecting means arranged on said housing to provide for said sheath-retaining members to be selectively connected to said housing to extend radially from said housing at a variety of angles to provide for selection of a most useful angle of entrance of a push-pull cable to suit a particular application.

2. The assembly according to claim 1 in which said housing includes resilient sealing members attached to said first, second and intermediate members, said sealing members arranged about said apertures to sealingly cooperate with said discs to substantially seal said apertures against the passage of water.

3. The assembly according to claim 2 in which an electric switch means for controlling electric current is contained within at least one of said sealing members and a magnet is connected to said disc for cooperating with said switch means for controlling electric current according to rotational position of said control member.

4. The assembly according to claim 1 including aligned holes in said housing members and holes in said discs arranged to be alignable to enable access to said core-connecting means for replacement of a cable without dismantling said assembly.

5. The assembly according to claim 1 for operation of more than two control levers, further comprising said housing including a plurality of intermediate members, being n in number, where n is a number greater than one, interposed between said first and second side members, providing n−1 additional rectangular apertures, said additional apertures formed between adjacent intermediate members; and including n−1 additional control members, with said additional control members extending through said additional apertures.

6. The assembly according to claim 1 in which said housing includes resilient sealing members attached to said first, second and intermediate members, said sealing members arranged about said apertures to sealingly cooperate with said discs to substantially seal said apertures against the passage of water, and further including aligned holes in said housing members and holes in said discs arranged to be alignable to enable access to said core-connecting means for replacement of said cable without dismantling said assembly.

7. The assembly according to claim 6 in which an electric switch means for controlling electric current is contained within a sealing member and a magnet is connected to said disc for cooperating with said switch means for controlling electric current according to rotational position of said control member.

8. The assembly according to claim 6 for operation of more than two control levers, further comprising said housing including a plurality of intermediate members, being n in number, where n is a number greater than one, interposed between said first and second side members, providing n−1 additional rectangular apertures, said additional apertures formed between adjacent intermediate members; and including n−1 additonal control members, with said additonal control members extending through said additional apertures.

9. The assembly according to claim 8 in which an electric switch means for controlling electric current is contained within a sealing member and a magnet is connected to said disc for cooperating with said switch means for controlling current according to rotational position of said control member.

10. An actuator assembly for moving at least one core of push-pull cables relative to their sheaths comprising:
a) a stationary housing including:
1) a first side member;
2) a second side member;
3) at least one intermediate member interposed between second side members;
4) securing means on said first and second side members for securely mounting said assembly to a fixed structure, and joining means for removably joining said side and intermediate members together, said intermediate member cooperating with adjacent intermediate members and with said side members to form a closed upper surface on said housing with a plurality of substantially rectangular apertures therein;
b) a plurality of movable control members, each said control member including: a flat, substantially circular disc journalled for rotation about a control axle means, said control axle means passing through the center of said disc and being supported by said housing for rotatably supporting said disc; a control lever extending radially from an edge of said disc; a handle affixed to the distal end of said lever for manual rotation of said disc; and a plurality of core-connecting means disposed on said disc in a circle about said center arranged for connecting to the core of a push-pull cable at a selected point on said circle, with pairs of said connecting means being opposed for selectively connecting a core to a first member of a pair of said connecting means to move a first core in a first direction and to a second member of said pair to move a second core in a second opposite direction when said disc is rotated by pushing said handle in one direction; said pair of opposed connecting means also serving for connecting to the cores of a pair of push-pull cables for serving as a connection for linking at least two control assemblies together for controlling a common element, each said control member rotatably supported on said axle means with said control lever and a portion of said disc extending above said upper surface through one of said rectangular appertures; and
c) a plurality of sheath-retainer members, each said retainer member arranged for cooperating with a sheath of at least one push-pull cable to retain a portion of said sheath to essentially prevent axial movement thereof during actuation of a core by said control member.

* * * * *